United States Patent Office 2,923,688
Patented Feb. 2, 1960

2,923,688

COMPOSITION OF MATTER FOR THE CONTROL OF FOAM

Stephen Aloysius Szumski and Milton Andrew Petty, Pearl River, N.Y., assignors to American Cyanamid Company, New York, N.Y., a corporation of Maine No Drawing. Application January 29, 1958
Serial No. 711,795

11 Claims. (Cl. 252—321)

This invention relates to new compositions of matter for the control of foam and to methods of preparing and using the same.

In many industrial operations, for instance the production of antibiotics and other chemical compounds by aerobic fermentation of aqueous nutrient media, the manufacture of paper, treatment of sewage, and in other operations involving aqueous systems, the control of the development of excessive amounts of foam is an important part of the process. Excess foaming often seriously hampers the most efficient conduct of the process.

Various methods have been developed to control foaming. A very common and effectively employed method of controlling the development of excess amounts of foam in aqueous systems comprises the addition to the foaming material of small amounts of triglyceride oils from time to time and in such amounts as may be necessary. The foam-controlling properties of these triglyceride oils are sometimes enhanced by the addition of other substances. For example, the addition of a small amount (about 10 percent by weight) of octadecanol to lard oil produces a product which has superior foam-suppressing properties when compared with lard oil alone.

We have found that rice oil sludge, a cheap, crude waste material, can be added to triglyceride oils to increase their foam-suppressing properties, thus making it possible to control the development of excess amounts of foam over aqueous systems cheaper and more effectively than heretofore possible. Because of the increased effectiveness of the new composition of the present invention, smaller amounts of the triglceride oil are required to control foam; and, in addition, cheaper triglyceride oils can be used satisfactorily. This is important because the antifoaming agent represents an expensive part of the process. A further advantage accrues from the fact that some triglyceride oils are toxic to some microorganisms; and the use of smaller amount of the triglyceride oil, which is made possible by the present invention, results in a better fermentation.

Rice oil sludge is a material which can be recovered from crude rice bran oil by filtration or centrifugation. It is a pasty mixture of unknown composition, about 20 percent waxy material and 80 percent gummy material, intimately mixed in a rice oil vehicle. No important use for this crude rice sludge is known at present.

Rice bran oil is an article of commerce. It is recovered from rice bran either by pressing or by extraction with a fat solvent such as hexane. On standing, the crude rice bran oil develops a sludge which may be separated from the crude oil by filtration or centrifugation; and this crude rice oil sludge may be used in practicing the process of the present invention. Higher yields of the sludge may be obtained from the crude rice oil by chilling the crude oil and allowing it to stand for a while before filtering or centrifuging. This rice oil sludge may be recovered from crude rice bran oil which has been obtained from rice bran by either extraction with a fat solvent or by pressing. We have used rice oil sludge successfully from both types of rice bran oil.

To illustrate the effectiveness of the compositions of the present invention in controlling foam, several series of comparative foam-control experiments were conducted. In one such series, 40 milliliters of a typical fermentation liquor as is used in the production of antibiotics, for instance the fermentation medium for the production of chlortetracycline by means of the microorganism *Streptomyces aureofaciens* as described in the United States patent to Joseph G. Niedercorn No. 2,609,329, issued September 2, 1952, was placed in 250-milliliter graduated cylinders. A diffuser, a porous stone made of fused crystalline alumina grains, was fastened on the end of a rubber tube and submerged in the uninoculated fermentation mash in the graduated cylinders. Air was then forced through the diffuser and foam was developed over the liquid. When the volume of foam had reached a constant level, the volume was recorded and 0.2 milliliter of an antifoaming agent was added. The volume of foam was determined again one minute after the addition of defoaming agent. A second 0.2-milliliter addition of defoamer was then made, and the volume of the foam was determined again after a one-minute period. A number of triglyceride oils were examined in this manner for their foam-suppressing properties and compared with the same oils in which 2 percent by weight of rice oil sludge had been suspended. The results of this series of experiments are shown in the following table:

Table I

| Defoamer | Foam Volume in Milliliters | | |
|---|---|---|---|
| | Initial | After 1st Addition | After 2d Addition |
| Lard Oil | 250 | 225 | 215 |
| Lard Oil+Rice Sludge | 250 | 125 | 115 |
| Corn Oil | 250 | 145 | 125 |
| Corn Oil+Rice Sludge | 250 | 95 | 90 |
| Soya Bean Oil | 250 | 230 | 230 |
| Soya Bean Oil+Rice Sludge | 250 | 115 | 90 |
| Rice Bran Oil | 250 | 155 | 150 |
| Rice Bran Oil+Rice Sludge | 250 | 115 | 110 |

In another series of experiments, the aqueous nutrient medium had been previously inoculated with a chlortetracycline-producing strain of *Streptomyces aureofaciens* and fermented as in commercial production. To aliquots of the fermenting medium was added triglyceride oil and triglyceride oil augmented with 2 percent by weight of rice oil sludge. The results of this series of experiments are shown in the following table:

Table II

| Defoamer | Foam Volume in Milliters | | |
|---|---|---|---|
| | Initial | After 1st Addition | After 2d Addition |
| Lard Oil | 155 | 120 | 115 |
| Lard Oil+Rice Sludge | 155 | 95 | 90 |
| Corn Oil | 155 | 110 | 105 |
| Corn Oil+Rice Sludge | 155 | 90 | 85 |
| Soya Bean Oil | 155 | 110 | 105 |
| Soya Bean Oil+Rice Sludge | 155 | 95 | 90 |
| Rice Bran Oil | 155 | 100 | 95 |
| Rice Bran Oil+Rice Sludge | 155 | 90 | 85 |

As will be seen from these experiments, crude rice oil sludge has a beneficial effect on the foam-depressing properties of a variety of common glyceride oils, which are used as foam depressants. The invention is not limited to the use of any particular glyceride oil. As will be seen from the above, rice oil sludge improves the antifoam properties of glyceride oils of both vegetable and animal origin. The amount of rice oil sludge to be added to the triglyceride oils may vary advantageously from about one-half of 1 percent to 10 percent or more. The crude rice oil sludge may be dissolved or dispersed in the triglyceride oil in any suitable manner.

The amount of the glyceride oil fortified with rice oil sludge that is required to control foaming will obviously vary with the particular industrial operation involved. The rise of foam is very difficult to predict. Accordingly, the operator will add the foam depressant from time to time and in such amounts as may be required. Various methods of adding the foam depressant are known to those skilled in the art, and these may be used to add the rice oil sludge-glyceride oil composition of the present invention. It may be added to the liquid or to the foam. It may be introduced as a spray with the aerating air which is conventionally used in fermentation processes for the production of antibiotics. Special foam applicators have been devised, and these may be used to distribute the antifoaming composition in known manner.

We claim:

1. A composition of matter for the control of foam over aqueous liquids which comprises a glyceride oil to which has been added from 0.5% to 10% by weight of rice oil sludge.

2. A composition of matter for the control of foam over aqueous substances which comprises lard oil having dispersed therein 0.5 to 10 percent by weight of rice oil sludge.

3. A composition of matter for the control of foam over aqueous substances which comprises corn oil having dispersed therein 0.5 to 10 percent by weight of rice oil sludge.

4. A composition of matter for the control of foam over aqueous substances which comprises soy bean oil having dispersed therein 0.5 to 10 percent by weight of rice oil sludge.

5. A method of controlling the development of foam over aqueous liquids which comprises the step of adding to said aqueous foaming body a small quantity of a glyceride oil to which has been added 0.5 to 10 percent by weight of rice oil sludge.

6. A method of controlling the development of foam over aerated fermentation liquors which comprises the step of adding to said fermentation liquor small amounts of a glyceride oil containing 0.5 to 10 percent by weight of rice oil sludge.

7. A method of controlling the development of foam over an aerated *Streptomyces aureofaciens* which comprises the step of adding to said fermentation liquor small amounts of a glyceride oil containing 0.5 to 10 percent by weight of rice oil sludge.

8. A method of controlling the development of foam over aerated fermentation liquors which comprises the step of adding to said fermentation when excess foaming occurs a small amount of lard oil having dispersed therein 0.5 to 10 percent by weight of rice oil sludge.

9. A method of controlling the development of foam over aerated fermentation liquors which comprises the step of adding to said fermentation when excess foaming occurs a small amount of corn oil having dispersed therein 0.5 to 10 percent by weight of rice oil sludge.

10. A method of controlling the development of foam over aerated fermentation liquors which comprises the step of adding to said fermentation when excess foaming occurs a small amount of soy bean oil having dispersed therein 0.5 to 10 percent by weight of rice oil sludge.

11. A method of controlling the development of foam over aerated fermentation liquors which comprises the step of adding to said fermentation when excess foaming occurs a small amount of crude rice oil which contains 0.5 to 10 percent by weight of rice oil sludge.

References Cited in the file of this patent

UNITED STATES PATENTS

| 2,097,121 | Fromm | Oct. 26, 1937 |
| 2,101,089 | Novak | Dec. 7, 1937 |
| 2,412,276 | Larsen | Dec. 10, 1946 |
| 2,668,138 | Walker et al. | Feb. 2, 1954 |
| 2,762,780 | Kulakow | Sept. 11, 1956 |

OTHER REFERENCES

Lewkowitsch: Chemical Technology & Analysis of Oils, Fats and Waxes, fifth ed., 1915, Macmillan and Co. of London, vol. II, p. 321, and vol. III, p. 450.